United States Patent [19]

Kadis et al.

[11] Patent Number: 5,007,276

[45] Date of Patent: Apr. 16, 1991

[54] SEAL ARRANGEMENT FOR USE IN A PRESS ASSEMBLY

[75] Inventors: Paul M. Kadis, Chardon; Susan E. Pfaff, Seven Hills, both of Ohio

[73] Assignee: Teledyne Industries, Inc., Cleveland, Ohio

[21] Appl. No.: 521,095

[22] Filed: May 9, 1990

[51] Int. Cl.⁵ .......................................... B21D 24/08
[52] U.S. Cl. ...................................... 72/351; 92/86; 267/119
[58] Field of Search ................. 72/351, 453.13; 92/86, 92/168; 267/119

[56] References Cited

U.S. PATENT DOCUMENTS

| | | |
|---|---|---|
| 3,202,411 | 8/1965 | Heiser . |
| 3,293,994 | 12/1966 | Napolitano ............................ 92/86 |
| 4,342,448 | 8/1982 | Wallis ................................. 267/119 |
| 4,447,047 | 5/1984 | Newell ................................ 267/119 |
| 4,667,472 | 5/1987 | Clay et al. ............................. 92/86 |
| 4,765,227 | 8/1988 | Balazs et al. . |

Primary Examiner—Lowell A. Larson
Attorney, Agent, or Firm—Tarolli, Sundheim & Covell

[57] ABSTRACT

An improved seal arrangement is used in a cushion assembly of a press. The seal arrangement includes a high pressure piston seal assembly which is connected with a piston and is disposed in sealing engagement with a cylinder of the cushion assembly. The high pressure piston seal assembly blocks fluid flow between upper and lower variable volume chambers of the cushion assembly. A high pressure cylinder seal assembly is disposed in sealing engagement with a piston rod and the cylinder to block fluid flow from the upper variable volume chamber along the piston rod. An outer low pressure seal assembly is also provided between the piston rod and cylinder to block contaminants from entering the cylinder from the surrounding environment. A low pressure leak down chamber is provided between the high pressure cylinder seal assembly and the low pressure seal assembly. A pressure relief valve assembly is operable to exhaust fluid pressure from the leak down chamber to prevent exposure of the low pressure seal assembly to excessive fluid pressures during operation of the press.

35 Claims, 4 Drawing Sheets

SEAL ARRANGEMENT FOR USE IN A PRESS ASSEMBLY

BACKGROUND OF THE INVENTION

An improved seal arrangement is used in one or more components of a press assembly.

Known metal working press assemblies may have cushion assemblies to provide forces which oppose movement of one or more components of the press assemblies during operation of the press assemblies. A cushion assembly may be connected with work holding members, die members, and/or other components of a press assembly. During operation of a press assembly, a cushion assembly is exposed to dirt, metal chips and other contaminants in the environment in which the press assembly operates. To prevent these contaminants from entering the cushion assembly, dirt or contaminant seals may be provided between a piston rod and cylinder of the cushion assembly in the manner disclosed in U.S. Pat. No. 3,202,411 and in U.S. Pat. No. 4,765,227.

Since a piston rod may be subject to sideward forces during operation of a press assembly, seals have been constructed to accommodate tilting and/or sideward movement of the piston rod. To accommodate tilting and/or sideward movement of a piston rod, seal assemblies have been constructed and mounted in such a manner as to enable them to shift sideways, relative to a cylinder, with the piston rod. Known dirt seal assemblies have been constructed so as to block movement of dirt or contaminants into a cylinder. However, these known dirt seal assemblies are not intended for use with relatively high fluid pressures.

SUMMARY OF THE INVENTION

The present invention provides a new and improved seal arrangement for use in a press assembly. The seal arrangement includes a high pressure piston seal assembly. The piston seal assembly is connected with a piston and is disposed in sealing engagement with a cylinder to block fluid flow between chambers on opposite sides of the piston A high pressure cylinder seal assembly is connected with the cylinder The high pressure cylinder seal assembly is disposed in sealing engagement with a piston rod to block fluid flow from the cylinder along the piston rod.

A low pressure outer seal assembly is disposed between the cylinder and piston rod to block contaminants from outside the cylinder from entering the cylinder. Any fluid which may leak past the high pressure cylinder seal assembly is received in a leak down chamber formed between the high pressure cylinder seal assembly and the low pressure outer seal assembly. A pressure relief assembly may advantageously be provided to exhaust fluid pressurefrom the leak down chamber. The pressure relief assembly prevents exposure of the low pressure seal assembly to excessive fluid pressures during operation of the press assembly.

Although the various seal assemblies could be mounted in many different ways, one or more of the seal assemblies may advantageously be disposed in an end cap connected with one end of the cylinder. Thus, the high pressure cylinder seal assembly and the low pressure outer seal assembly may be disposed in the end cap. The high pressure cylinder seal assembly may be disposed between a side surface of the end cap and a side surface of a flange which extends radially inwardly from the wall of the cylinder. If desired, the flange may be used as a stop to limit movement of the piston.

Accordingly, it is an object of this invention to provide a new and improved seal arrangement which includes a high pressure piston seal assembly, a high pressure cylinder seal assembly, and a low pressure outer seal assembly.

Another object of this invention is to provide a new and improved seal arrangement as set forth in the preceding object wherein a low pressure chamber is provided between the cylinder and outer seal assemblies.

Another object of this invention is to provide a new and improved seal arrangement as set forth in either of the preceding objects and wherein the cylinder and outer seal assemblies are at least partially disposed in a cylinder end cap.

BRIEF DESCRIPTION OF THE DRAWINGS

The foregoing and other objects and features of the present invention will become more apparent upon consideration of the following description taken in connection with the accompanying drawings wherein.

DESCRIPTION OF ONE SPECIFIC PREFERRED EMBODIMENT OF THE INVENTION

Press Assembly—General Description

Figure 1:
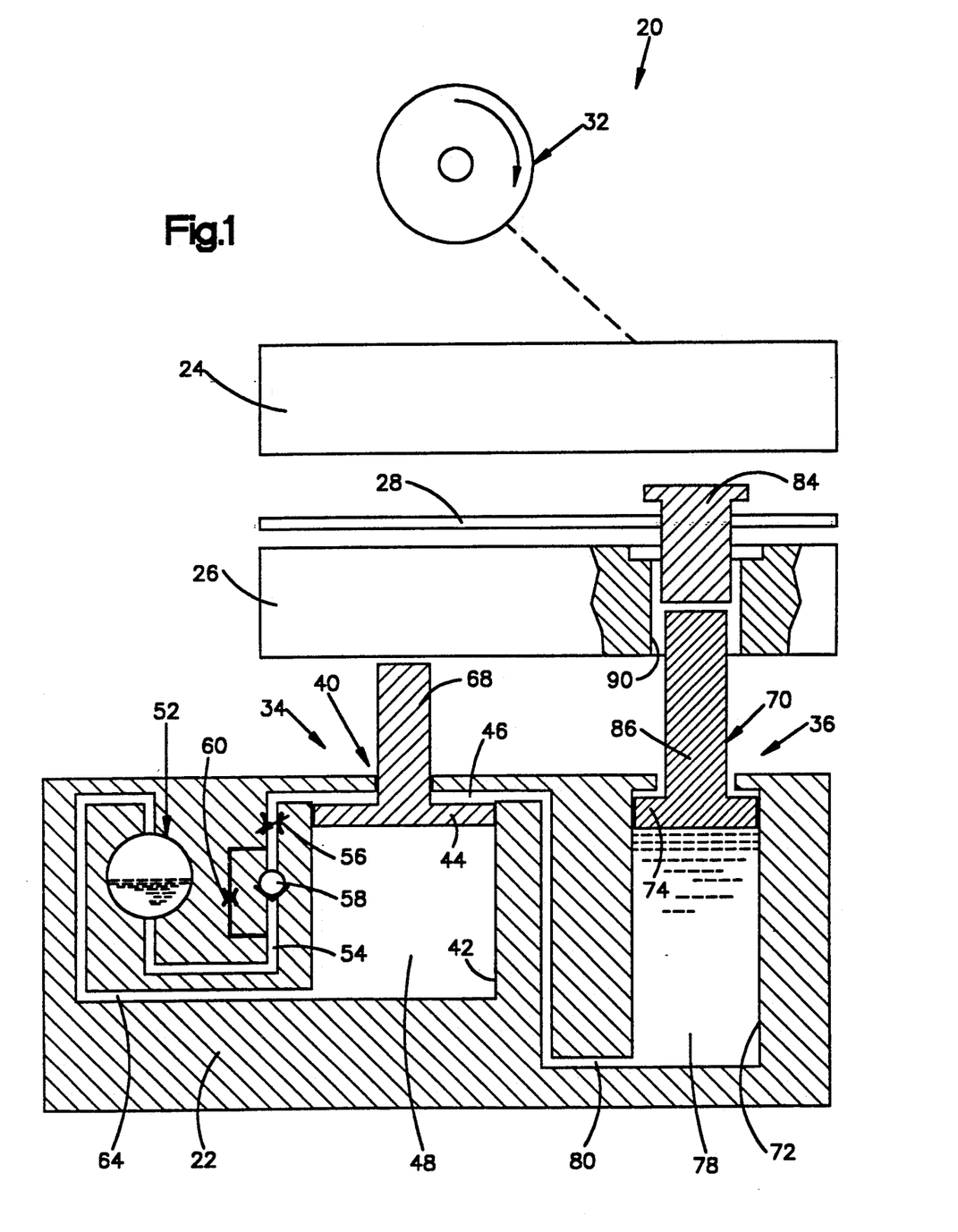
FIG. 1 is a schematic illustration of a press assembly, the press assembly being shown in an open condition.

An improved press assembly 20 is illustrated schematically in FIG. 1. The press assembly 20 includes a stationary base 22. An upper draw ring or member 24 cooperates with a movable lower draw ring or member 26 during operation of the press assembly to deform a sheet metal workpiece 28. During operation of the press assembly 20, the upper and lower draw rings 24 and 26 are operable to apply pressure to opposite sides of the sheet metal workpiece 28 to firmly grip the workpiece between the draw rings. Once the workpiece 28 has been gripped between the upper and lower draw rings 24 and 26, the draw rings are lowered to deform the workpiece around a die (not shown) in a stretch forming operation.

The upper and lower draw rings or members 24 and 26 have a generally rectangular configuration with an open central portion. The openings in the central portions of the upper and lower draw rings 24 and 26 have configurations corresponding to the configurations of the die around which the workpiece 28 is to be drawn. It should be understood that the upper and lower draw rings 24 and 26 have only been shown very schematically in the drawings and may have any desired configuration.

When the press assembly 20 is operated to stretch draw the sheet metal workpiece 28, a drive assembly 32 moves the upper draw ring 24 downwardly toward the workpiece 28. As the downward motion of the upper draw ring 24 continues, the upper draw ring and workpiece 28 impact against the lower draw ring 26 to firmly grip the edges of the sheet metal workpiece. The upper and lower draw rings 24 and 26 are then lowered together to stretch the workpiece 28 over the lower die and thereby deform the workpiece.

An improved cushion assembly 34 is mounted on the base 22. The cushion assembly 34 applies a yieldable force to the lower draw ring 26. This yieldable force opposes downward movement of the lower draw ring 26 during operation of the press assembly to a closed condition. Thus, the cushion assembly 34 cushions movement of components of the press assembly 20 during the closing of the press assembly. Although only a single cushion assembly 34 has been shown schematically in the drawings, it should be understood that the press assembly 20 includes a plurality of cushion assemblies 34.

A control assembly 36 is operable to effect acceleration of the lower draw ring 26 before the upper draw ring 24 closes on the lower draw ring In addition, the control assembly 36 is operable to effect deceleration of the lower draw ring 26 before it is stopped at the initial position shown in FIG. 1 during operation of the press assembly 20 from a closed condition to an open condition. By accelerating the lower draw ring 26 during closing of the press assembly 20, shock loading is reduced when the upper draw ring 24 and workpiece 28 are impacted against the lower draw ring 26. By decelerating the lower draw ring 26 during opening of the press assembly 20, rebounding of the lower draw ring 26 and press vibration are reduced as the lower draw ring is stopped at its initial position. Although only a single control assembly 36 has been shown schematically in the drawings, it should be understood that the press assembly 20 includes a plurality of control assemblies 36.

Cushion Assembly

The improved cushion assembly 34 includes a piston and cylinder assembly 40. The piston and cylinder assembly 40 includes a cylinder 42 which is connected with the base 22. A piston 44 divides the cylinder 42 into upper and lower variable volume chambers 46 and 48. The upper variable volume chamber 46 contains hydraulic fluid and is connected in fluid communication with an accumulator 52 through a conduit 54.

An adjustable flow control orifice 5 is provided in the conduit 54 to restrict hydraulic fluid flow through the conduit to a relatively low rate. A check valve 58 blocks hydraulic fluid flow from the variable volume chamber to the accumulator 52 through the main conduit 54. However, a restricted bleed passage 60 enables a small amount of hydraulic fluid to flow from the accumulator 52 to the upper variable volume chamber 46 in the cushion assembly 34 to compensate for any leakage of hydraulic fluid from the chamber.

The lower variable volume chamber 48 in the cushion assembly 34 is filled with a gas, specifically nitrogen. The lower variable volume chamber 48 is connected with the accumulator 52 through a conduit 64. The accumulator 52 is pressurized to maintain a predetermined minimum fluid pressure in the lower variable volume chamber 48.

During operation of the press assembly 20 from an open condition (FIG. 1) to a closed condition, the lower draw ring 26 is supported by an upwardly extending piston rod 68 connected with the piston 44. As the press assembly 20 closes, the lower draw ring 26 moves the piston 44 downwardly and decreases the size of the lower variable volume chamber 48. As the gas in the lower variable volume chamber 48 is compressed, the cushion assembly 34 applies a yieldable force against the lower draw ring 26.

As the press assembly 20 is operated from the closed condition back to the open condition, the cushion assembly 34 applies a force against the lower draw ring 26 to support the lower draw ring and move it back to the initial position shown in FIG. 1. As this happens, the lower variable volume chamber 48 increases in size. Although the size of the lower variable volume chamber 48 increases and the fluid pressure in the chamber 48 may tend to decrease, the fluid pressure is more than sufficient to maintain the piston 44 in the extended position shown in FIG. 1 and to support the lower draw ring 26.

Although only a single cushion assembly 34 has been shown in FIG. 1, it should be understood that there are a plurality of identical cushion assemblies to support the lower draw ring 26 and apply a yieldable force against the lower draw ring during closing of the press assembly. Thus, there is a rectangular array of cushion assemblies 34 to support the lower draw ring 26.

Control Assembly

The control assembly 36 is operable to effect acceleration of the lower draw ring 26 in a downward direction prior to impacting of the workpiece 28 and upper draw ring 24 against the lower draw ring during operation of the press assembly 36 to the closed condition. In addition, the control assembly 30 is operable to effect deceleration of the draw ring 26 prior to stopping of the draw ring during operation of the press assembly 20 to the open condition. To accomplish this, the control assembly 36 transmits force between the cushion assembly 34 and the upper draw ring 24.

The control assembly 36 includes a piston and cylinder assembly 70. The piston and cylinder assembly 70 includes a cylinder 72 disposed in the base 22 and having a central axis extending parallel to a central axis of the cushion cylinder 42. A control piston 74 is disposed in the cylinder 72 and divides the cylinder into upper and lower variable volume chambers 76 and 78. The lower variable volume chamber 78 contains hydraulic fluid and is connected in fluid communication with the upper chamber 46 of the cushion assembly 34 through a conduit 80. The upper variable volume chamber 76 of the control assembly 36 is vented to the atmosphere.

A force transmitting member or pin 84 is engaged by a piston rod 86 connected with the control piston 74. The force transmitting member 84 transmits force between the upper draw ring 24 and the control assembly 36. The cylindrical force transmitting member 84 extends through a cylindrical opening 90 formed in the lower draw ring 26 and engages an upper end of the piston rod 86. Although it is preferred to form the force transmitting member 84 separately from the piston rod 86, it is contemplated that the piston rod 86 could be extended through the opening 90 so that the piston rod itself would function as the force transmitting member. If desired, the force transmitting member 84 and piston rod 86 could be disposed to one side of the lower draw ring 26 so that it would not be necessary to have an opening 90 extending through the lower draw ring 26.

It should be understood that although only a single control assembly 36 has been shown in FIG. 1, there are a plurality of identical control assemblies 36 arranged in a rectangular array about the periphery of the lower draw ring 26. The plurality of control assemblies are connected in fluid communication with and operable to transmit hydraulic fluid pressure forces to a plurality of cushion assemblies 34 which are also disposed in a rectangular array about the periphery of the lower draw ring 26.

Operation

When the press assembly 20 is in the open condition of FIG. 1, the upper draw ring 24 is spaced a substantial distance above the lower draw ring 26. The lower draw ring 26 is supported by the extended cushion assembly 34. At this time, the force transmitting member 84 projects upwardly from the upper side of the lower draw ring 26 toward the upper draw ring 24. The force transmitting member 84 is supported on the upper end of the piston rod 86 of the extended control piston and cylinder assembly 70.

The workpiece 28 is disposed between the upper and lower draw rings 24 and 26. The workpiece is supported by the lower draw ring 26 and is disposed inwardly of the force transmitting member 84. Thus, although the force transmitting member 84 extends into the opening 90 in the lower draw ring 26, the force transmitting member does not extend through the workpiece 28.

The cushion assembly 34 is maintained in the extended condition shown in FIG. 1 by the fluid pressure, that is, nitrogen gas pressure, in the lower variable volume chamber 48. The gas pressure in the lower variable volume chamber 48 and accumulator 52 is more than adequate to support the lower draw ring 26 and cushion piston 44. The control assembly 36 is maintained in the extended condition shown in FIG. 1 by hydraulic fluid pressure in the lower variable volume cylinder chamber 78. The fluid pressure in the variable volume cylinder chamber 78 is more than adequate to support the control piston 74 and force transmitting member 84.

When the press assembly 20 begins to operate from the open condition toward the closed condition, the drive assembly 32 moves the upper draw ring 24 downwardly toward the lower draw ring 26 in a known manner. At this time, the lower draw ring 26 is stationary in the initial position shown in FIG. 1. The cushion assembly 34 and control assembly 36 are in their extended conditions.

As the upper draw ring 24 moves toward the lower draw ring 26, the lower side of the upper draw ring 24 engages the force transmitting member 84. As the upper draw ring 24 moves into engagement with the force transmitting member 84, force is transmitted from the upper draw ring 24 to the cushion assembly 34 to initiate operation of the cushion assembly toward a retracted condition. As the cushion assembly 34 is retracted, the lower draw ring 26 is accelerated in a downward direction.

When the upper draw ring 24 engages the force transmitting member 84, the force transmitting member 84 is pressed downwardly against the piston rod 86 in the control assembly 36. The force applied against the piston rod 86 is transmitted to the piston 74. The piston 74 applies force against the hydraulic fluid in the lower variable volume chamber 78. The fluid pressure generated in the lower variable volume chamber 78 by the piston 74 causes hydraulic fluid to flow from the control assembly 36 through the conduit 80 to the cushion assembly 34.

The flow of fluid from the control assembly 36 to the cushion assembly 34 causes the cushion assembly to retract. Thus, hydraulic fluid flows from the conduit 80 into the upper variable volume chamber 46 of the cushion assembly 34. The fluid pressure in the upper variable volume chamber 46 causes the piston 44 to move downwardly and compress the gas in the lower variable volume chamber 48. As the piston 44 moves downwardly, the piston rod 68 and lower draw ring 26 move downwardly. This is because the lower draw ring 26 is supported on the piston rod 68 and is movable with the piston rod.

The speed of downward movement of the lower draw ring 26 is less than the speed of downward movement of the upper draw ring 24. Therefore, the upper draw ring and workpiece 28 impact against the slower moving lower draw ring 26. When the upper draw ring 24 impacts against the lower draw ring 26, the workpiece 28 is gripped between he draw rings and the draw rings move downwardly together. Since the lower draw ring 26 is moving downwardly when the upper draw ring 24 and workpiece 28 impact against the lower draw ring 26, the shock loading forces on the press assembly 20 are substantially less than would be the case if the lower draw ring 26 was stationary when the upper draw ring impacted with the lower draw ring. In addition to reducing shock loading forces, having the lower draw ring 26 moving downwardly when the upper draw ring 24 closes against it reduces the amount of noise associated with operating the press assembly 20.

As the upper and lower draw rings 24 and 26 move downwardly together with the workpiece 28 gripped between them, the cushion assembly 34 and control assembly 36 are retracted at the same rate. This is because the cushion assembly piston 44 and the control assembly piston 74 move downwardly with the upper and lower draw rings 26 and 24 which are moving downwardly at the same speed. As the piston 44 in the cushion assembly 34 moves downwardly under the influence of force transmitted to the piston rod 68 from the lower draw ring 26, the gas in the lower variable volume chamber 48 is compressed. Since the rod end area of the cushion piston 44 is twice as great as the head end area of the control piston 74, the upper variable volume chamber in the cushion assembly 34 expands at a greater rate than the rate of contraction of the lower variable volume chamber 78 in the control assembly 36. This results in the occurrence of cavitation in the upper variable volume chamber 46 of the cushion assembly 34.

When cavitation occurs in the upper variable volume chamber 46, hydraulic fluid can flow from the accumulator 52 through the conduit 54 and check valve 58 to the upper variable volume chamber. However, the flow restrictor valve 56 is set to limit the rate of hydraulic fluid flow to a very small amount which, for all practical purposes, can be ignored. However, this rate of hydraulic fluid flow is adequate to compensate for any leakage which may occur in the system.

Since cavitation occurs in the upper variable volume chamber 46 of the cushion assembly 34, there is a relatively large pressure differential across the piston 44. This enables the cushion assembly 34 to provide a substantial upwardly directed and yieldable force opposing downward movement of the piston 44 as the gas in the lower variable volume chamber 48 is compressed. Due to the substantial pressure differential across the cushion piston 44, the cushion assembly 34 is operable to cushion shock loading on the components of the press assembly as the press assembly moves to the fully closed condition.

When the press assembly 20 is closed, the cushion assembly 34 is retracted. The control assembly 36 is also retracted. The upper and lower draw rings 24 and 26 are in their lowermost positions At this time, the workpiece 28 has been fully deformed by a die during a stretch draw operation.

Immediately after the press assembly 20 reaches the closed condition, the press assembly 20 starts to operate back to the open condition. As the press assembly starts to open, the press drive assembly 32 moves the upper draw ring 24 upwardly away from the base 22. As the upper draw ring 24 moves upwardly away from the base 22, the cushion assembly 34 expands to move the lower draw ring 26 upwardly with the upper draw ring 24. Thus, gas pressure in the lower variable volume chamber 48 of the cushion assembly 34 presses the piston 44 upwardly to maintain the lower draw ring 26 in abutting engagement with the upper draw ring 24 and workpiece 28.

As the upper and lower rings 24 and 26 move upwardly together, the lower cushion chamber 48 expands and the upper cushion chamber 46 contracts. This results in the elimination of the cavitation which previously occurred in the upper cushion chamber 46. During this initial upward movement of the cushion piston 44, fluid is not pumped from the cushion assembly 34 to the control assembly and the control assembly 36 remains contracted.

As soon as the cavitation has been eliminated in the upper cushion chamber 46, hydraulic fluid is pumped from the upper cushion chamber through the conduit 80 to move the control piston upwardly 74. The hydraulic fluid pressure force applied against the control piston 74 is transmitted through the piston rod 86 and force transmitting member 84 to the upper draw ring 24 to urge the upper draw ring 24 upwardly. This results in the transmission of energy back to the drive assembly 32.

During continued operation of the press assembly 20 toward the open condition, the speed of upward movement of the lower draw ring 26 is decreased relative to the speed of movement of the upper draw ring 24. Thus, the lower draw ring 26 is decelerated relative to the upper draw ring 24. This results in the upper and lower draw rings 24 and 26 separating in a manner shown schematically in FIG. 6.

The deceleration of the lower draw ring 26 and separation of the upper and lower draw rings results from the fact that the rod end of the cushion piston 44 has a larger area than the head end of the control piston 74. Thus, once the cavitation has been eliminated in the upper cushion chamber 46, hydraulic fluid is pumped from the upper chamber in the cushion assembly 34 to the lower chamber 78 in the control assembly 36. The lower chamber 78 in the control assembly 36 expands at a rate which is determined by the speed of upward movement of the upper draw ring 24. Thus, for each increment of upward movement of the draw ring 24, the control piston 74 moves up one increment.

The gas in the lower cushion chamber 48 is constantly pressing the cushion piston 44 upwardly to pressurize the hydraulic fluid in the upper variable volume chamber 46 of the cushion assembly This results in fluid pressure being transmitted through the conduit 80 to the lower control chamber 78. The hydraulic fluid pressure in the lower control chamber 78 presses the piston 74 and piston rod 86 upwardly to apply an upwardly directed force against the force transmitting member 84.

The force transmitting member 84 abuts the upper draw ring 24 and moves upwardly at the same speed as the upper draw ring 24. However, the speed of upward movement of the upper draw ring 24 is determined by the press drive 32. This results in the hydraulic fluid pressure in the lower chamber 78 of the control assembly being effective to apply force against the upper draw ring 24 urging the upper draw ring 24 upwardly. At this time, the rate of expansion of the cushion assembly 34 is retarded to one-half of the rate of expansion of the control assembly 36.

As the upper draw ring 24 continues to move upwardly, the cushion assembly 34 approaches a fully extended condition and the lower draw ring 26 approaches the initial or open press position shown in FIG. 1. When the cushion assembly 34 is fully extended, the upper draw ring 24 will have moved to its initial or open press position. The upward movement of the lower draw ring 26 is then stopped and the lower draw ring remains stationary in its initial position.

Since the lower draw ring 26 was decelerated to one-half of the speed of the upper draw ring 24, the inertia of the lower draw ring 26 is less than it would be if the lower draw ring 26 was moving at the same speed as the upper draw ring 24. Therefore, the tendency for the lower draw ring 26 to bounce when it is stopped at its initial open press position is substantially reduced. This results in a substantial reduction in the rebounding loads and vibrations to which the press assembly 20 is subjected.

After the lower draw ring 26 has reached the initial or open press condition, the upper draw ring 24 continues to move upwardly away from the lower draw ring 26 under the influence of the press drive assembly 32. This results in the upper draw ring 24 moving away from the force transmitting member 84. When the upper draw ring 24 reaches the open press or initial position of FIG. 1, upward movement of the upper draw ring 24 is stopped. Once the press assembly 20 has been operated to the open condition of FIG. 1, the deformed workpiece 28 can be readily removed from the press assembly 20.

The press assembly 20 has the same construction and mode of operation disclosed in U.S. patent application Ser. No. 429,200 filed Oct. 30, 1989 by John Terrell, Paul Kadis, Leonard Hiney, and Susan Pfaff and entitled "Press Assembly and Method Operation". However, the improved cushion assembly 34 could be used in other known presses if desired.

Seals—General Description

An improved seal arrangement 100 (FIG. 2), constructed in accordance with a feature of the present invention, is provided in the cushion assembly 34. The seal arrangement 100 blocks fluid flow between the upper and lower variable volume chambers 46 and 48. The seal arrangement 100 also blocks fluid flow from the upper variable volume chamber 46. In addition, seal arrangement 100 prevents contaminants from entering the cushion assembly 34. Although the seal arrangement 100 is particularly advantageous when used in the cushion assembly 34, the seal arrangement could be utilized in conjunction with a different type of cushion assembly or other components of a press assembly having a construction which is different than the construction of the press assembly 20.

The seal arrangement 100 includes a high pressure piston seal assembly 102, a high pressure cylinder seal assembly 104, and a low pressure outer seal assembly 106. The high pressure piston seal assembly 102 blocks fluid flow between the upper and lower variable volume chambers 46 and 48. The high pressure cylinder seal assembly 104 blocks fluid flow from the upper variable volume chamber 46 along the piston rod 68. The low pressure outer seal assembly 106 blocks contaminants in the environment outside the cushion assembly 34 from entering the cushion assembly.

It is contemplated that during operation of the press assembly 20 and cushion assembly 34, hydraulic fluid may leak past the high pressure cylinder seal assembly 104 to an annular leak down chamber 108. The leak down chamber 108 extends around the piston rod 68 and is disposed between the high pressure cylinder seal assembly 104 and the low pressure outer seal assembly 106.

If the low pressure outer seal assembly 106 is exposed to excessive fluid pressures during operation of the press assembly 20 and cushion assembly 34, the low pressure outer seal assembly may be blown or otherwise damaged. To prevent the low pressure outer seal assembly 106 from being exposed to excessive fluid pressures, a pressure relief valve assembly 112 is connected in fluid communication with the leak down chamber 108 through a passage 114.

When the fluid pressure in the leak down chamber 108 reaches a predetermined fluid pressure, the pressure relief valve assembly 112 opens and exhausts the annular leak down chamber 108 to a drain passage 116. The drain passage 116 is connected in fluid communication with the pressure relief valve assembly 112 through an annular recess 118 formed between a cylindrical side surface of an end cap 120 and a cylindrical recess 122 in the base 22. Although it is preferred to use the pressure relief valve assembly 112 to limit the fluid pressure in the leak down chamber 100, the pressure relief valve assembly could be omitted if desired.

The end cap 120 forms part of the cylinder 42. In the illustrated embodiment of the invention, the high pressure cylinder seal assembly 104 and low pressure outer seal assembly 106 are mounted in the end cap 120. The end cap 120 is connected with the end portion of a cylinder wall 126 by a threaded connection 128. The generally circular end cap 120 is connected to the base 122 by bolts 132.

Figure 2:
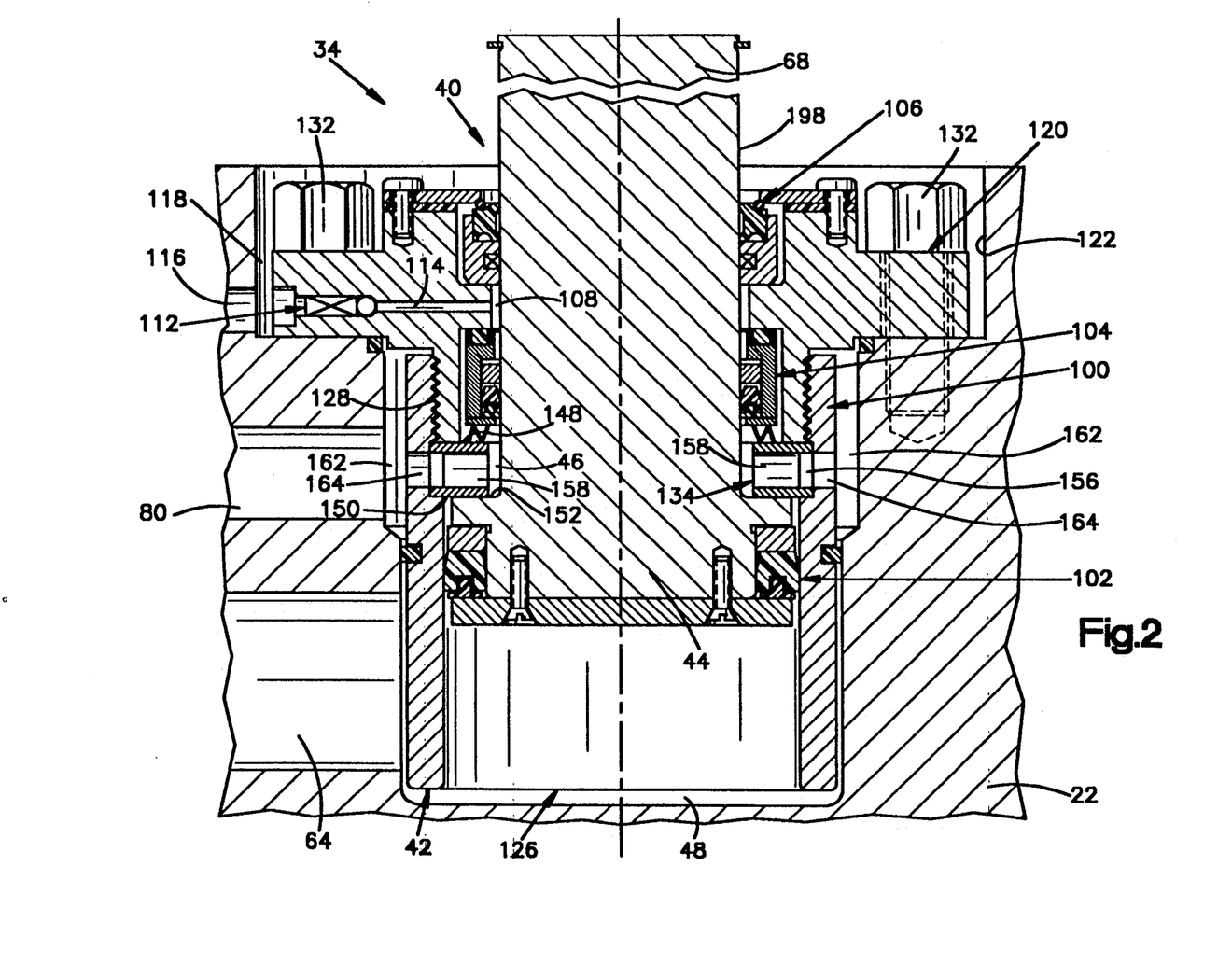
FIG. 2 is a sectional view illustrating the construction of a cushion assembly used in the press assembly of FIG. 1, the cushion assembly being shown in a fully extended condition.

An annular stop ring or flange 134 limits upward movement of the piston 44 (FIG. 2). In addition, the stop ring 134 conducts hydraulic fluid into an out of the upper variable volume chamber 46. A flat annular upper side surface 148 of the stop ring 134 holds the high pressure cylinder seal assembly 104 in place. A flat annular lower side surface 150 of the stop ring 134 engages a flat annular upper side surface 152 on the piston 44 to limit upward movement of the piston. To enable the stop ring 134 to withstand the forces applied against the stop ring by the piston 44, the stop ring is clamped in place between the end cap 120 and cylinder wall 126. Although it is preferred to form the stop ring or flange 134 as a separate member to facilitate replacement, the stop ring could be formed as one piece with the cylinder wall 126 or end cap 120.

The annular stop ring 134 includes an annular manifold passage 156 which opens radially outwardly and is cut inside of the stop ring 134. A plurality of cylindrical passages 158 extend radially between the annular manifold passage 156 and the variable volume chamber 46. It should be understood that there are a plurality of passages 158 extending through the stop ring 134 at equally spaced angular intervals about the circumference of the stop ring.

During operation of the cushion assembly 34, hydraulic fluid is conducted to and from the cylinder assembly 70 of the control assembly 36 (FIG. 1) through a conduit 80. The conduit 80 is connected with the cushion assembly 34 (FIG. 2). The conduit 80 is connected with the manifold chamber 156 in the stop ring 134 through an annular chamber 162. The chamber 162 extends around the outside of the cylinder wall 126. Cylindrical radial passages 164 extend through the cylinder wall 126 to conduct fluid to the annular manifold passage 156.

During operation of the cushion assembly 34 from the extended condition shown in FIG. 2 to the retracted condition, fluid flows from the control assembly 36 through the conduit 80. This fluid flows from the conduit 80 through the annular chamber 162, wall passages 164, manifold passage 156 and radial passages 158 to the upper variable volume chamber 46. Similarly, when the cushion assembly is being operated from a retracted condition back toward the extended condition shown in FIG. 2, fluid is exhausted from the upper variable volume chamber 46 through the radial passages 158 and manifold passage 156 in the stop ring 134, through the wall passages 164 and outer chamber 162 to the conduit 80.

When the piston 44 reaches the extended position in FIG. 2, the annular upper side surface 152 of the piston is disposed in abutting engagement with the annular lower side surface 150 of the stop ring 134. Forces applied against the stop ring 134 by the piston 44 are transmitted to the base 22 through the end cap 120. The stop ring 134 is clamped in place between an annular lower side surface of the end cap 120 and an annular ledge formed in the cylinder wall 126.

Seals—High Pressure Piston Seal Assembly

The high pressure piston seal assembly 102 (FIG. 3) extends between a cylindrical inner side surface 170 of the cylinder wall 126 and the piston 44 to block fluid flow between the upper variable volume chamber 46 and the lower variable volume chamber 48. The high pressure piston seal assembly 102 includes an annular piston seal ring 174. The piston seal ring 174 has an annular outer side 176 which is disposed in sealing engagement with the cylindrical inner side surface 170 of the cylinder wall 126. An annular inner side surface 178 of the piston ring 174 is disposed in sealing engagement with the cylindrical inner side surface 182 of the piston 44.

Fluid pressure forces applied against axially opposite sides of the piston ring seal 174 cause the seal to swell or expand radially outwardly and inwardly. This increases the sealing force between the seal ring 174 and the cylinder wall 126 and piston 44 as the fluid pressure in the variable volume chambers 46 and 48 increases. The seal ring 174 could have any one of many known different seal ring constructions which expand radially when subjected to fluid pressure forces. In the illustrated embodiment of the invention, the seal ring 174 is formed of urethane. Of course, the piston seal ring 174 could be made of other known materials desired.

An annular bearing ring 186 is provided immediately above the seal ring 174. The bearing ring 186 transmits sideward force between the piston 44 and the cylinder wall 126 when the piston is moved sidewardly in the cylinder 42. The bearing ring 186 has a slightly greater outside diameter than the piston 44. This enables the rigid bearing ring 186 to prevent excessive compaction of the seal ring 174. In addition, the bearing ring 186 prevents engagement of the piston 44 with the cylinder wall 126. The bearing ring 186 is formed of a relatively strong polymeric material having a low coefficient of friction. Of course, the bearing ring 186 could be made of other materials if desired.

A circular end plate 188 is connected with the lower end of the piston by bolts 189. The circular plate 188 holds the high pressure piston seal assembly 102 in place against an annular flange 190 on the piston 44. The circular plate 188 and annular flange 190 both have outside diameters which are less than the outside diameter of the bearing ring 186. Therefore, when the piston 44 is subjected to a side load, the bearing ring 186 blocks engagement of the end plate 188 and flange 190 with the cylinder wall 126.

Seals—High Pressure Cylinder Seal Assembly

The high pressure cylinder seal assembly 104 (FIG. 3) blocks fluid flow from the upper variable volume chamber 46 to the leak down chamber 108. The high pressure cylinder seal assembly 104 includes an annular seal carrier 194 which extends around the piston rod 68. The rigid seal carrier 194 is formed of hard coated annodized aluminum Of course, the seal carrier 194 could be formed of other materials if desired.

A high pressure piston rod seal 196 extends between a cylindrical outer side surface 198 of the piston rod 68 and a cylindrical inner side surface 200 of the seal carrier. The annular high pressure rod seal 196 blocks fluid flow between the outer side surface 198 of a piston rod 68 and the inner side surface 200 of the seal carrier 194 The annular rod seal 196 is formed of urethane and is supported on a metal annular washer 204 connected with the carrier 194. Of course, the rod seal 196 could be formed of other materials if desired.

A high pressure cylinder seal 208 extends between the carrier 194 and a radially extending inner flange 210 formed on the end cap 120. The annular cylinder seal 208 has an annular upper side surface which is disposed in sealing engagement with a flat annular downwardly facing side surface 212 on the flange 210. Similarly, a flat annular downwardly facing side surface of the cylinder seal ring 208 is disposed in sealing engagement with a flat annular upper side surface 214 on the seal carrier 194. Engagement of the cylinder seal ring 208 with the surfaces 212 and 214 blocks fluid flow between the carrier 194 and the end cap 120. In the illustrated embodiment of the invention, the annular cylinder seal 208 is formed of urethane. Of course, the cylinder seal 208 could be formed of other materials if desired.

An annular metal wave spring 220 is disposed between the flat annular upper side surface 148 of the stop ring 134 and a washer 204. The spring 220 supports the high pressure cylinder seal assembly 104 and presses the cylinder seal 208 against the flange 210 on the end cap 120. Of course, known types of spring assemblies other than the wave spring 220 could be used to press the carrier 194 upwardly.

An annular bearing ring 224 transmits force between the cylindrical side surface 198 of the piston rod 68 and the inner side surface 200 of the seal carrier 194. The rigid annular bearing ring 224 cooperates with the piston rod 68 to maintain the central axis of the generally cylindrical seal carrier 194 coincident with the central axis of the piston rod 68. Therefore, the spatial relationship between the annular rod seal 196, the annular cylinder seal 208 and the piston rod 68 is maintained constant even though the piston rod 68 is tilted or moved sidewardly due the application of sideward forces to the piston rod.

Seals—Low Pressure Outer Seal Assembly

The low pressure seal assembly 106 prevents dirt and other contaminants from entering the cylinder assembly 42. The low pressure outer seal assembly 106 includes a rigid annular outer seal carrier 230 which circumscribes the piston rod 68. The seal carrier 230 has a flat annular bottom surface 232 which abuttingly engages a flat annular upper side surface 234 on the flange 210.

The outer seal carrier 230 engages the piston rod 68 and moves sidewardly with the piston rod relative to the end cap 120. Therefore, the central axis of the annular seal carrier 230 remains coincident with the central axis of the piston rod 68 when the piston rod is tilted or moved sidewardly. The seal carrier 230 is made of a polymeric material having a low coefficient friction. Therefore, the cylindrical outer side surface 198 of the piston rod 68 can move freely relative to the seal carrier 230 and the seal carrier can move freely in a radial direction relative to the annular upper side surface 234 of the flange 210.

An annular scraper ring or outer seal 238 is disposed in an annular recess 240 formed in the seal carrier 230. The annular scraper ring 238 engages the cylindrical outer side surface 198 of the piston rod 68. The scraper ring 238 prevents dirt, metal chips, and other contaminants from moving downwardly along the piston rod 68 into the cylinder assembly 42.

The scraper ring 238 is disposed in sealing engagement with annular side surfaces of the recess 240 in the seal carrier 230. An annular O ring 244 sealingly engages the annular upper side surface of the scraper ring 238 and a lower inner side surface of a flat annular retainer plate 248. The retainer plate 248 is connected with the end cap 120 by suitable fasteners 250.

An annular wiper seal 254 is provided in a recess in the seal carrier 230. The wiper seal 254 sealingly engages the cylindrical outer side surface 198 of the piston rod 68. The wiper seal 254 blocks any small particles of contaminants which may have slipped past the scraper ring 238. The general construction of the low pressure of the seal assembly 106 is the same as is disclosed in U.S. Pat. No. 4,765,227.

Sideward and/or Tilting Movement of Piston Rod

When the piston rod 68 is tilted and/or moved sidewardly relative to the cylinder wall 126 and end cap 120, the seal assemblies 102, 104 and 106 move in such a manner as to maintain their respective seals. Thus, when the piston rod 68 is subject to a side loading during operation of the press assembly 20, the resulting tilting and/or sideward movement of the piston rod and piston 44 does not result in the seals 102, 104 and 106 losing their effectiveness.

Figure 3:
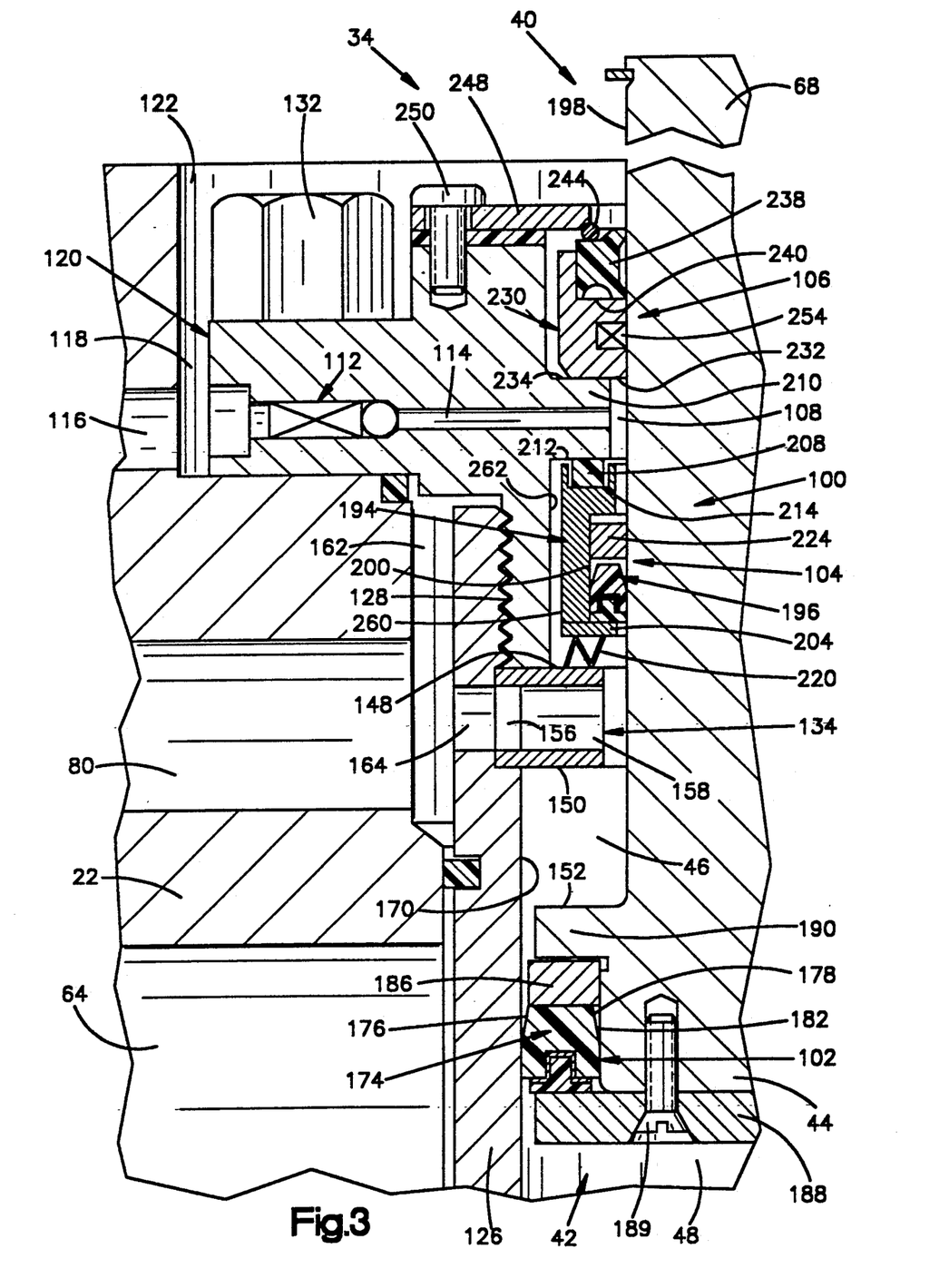
FIG. 3 is an enlarged fragmentary sectional view of a portion of the cushion assembly of FIG. 2, the cushion assembly being shown in a partially retracted condition.
Figure 4:
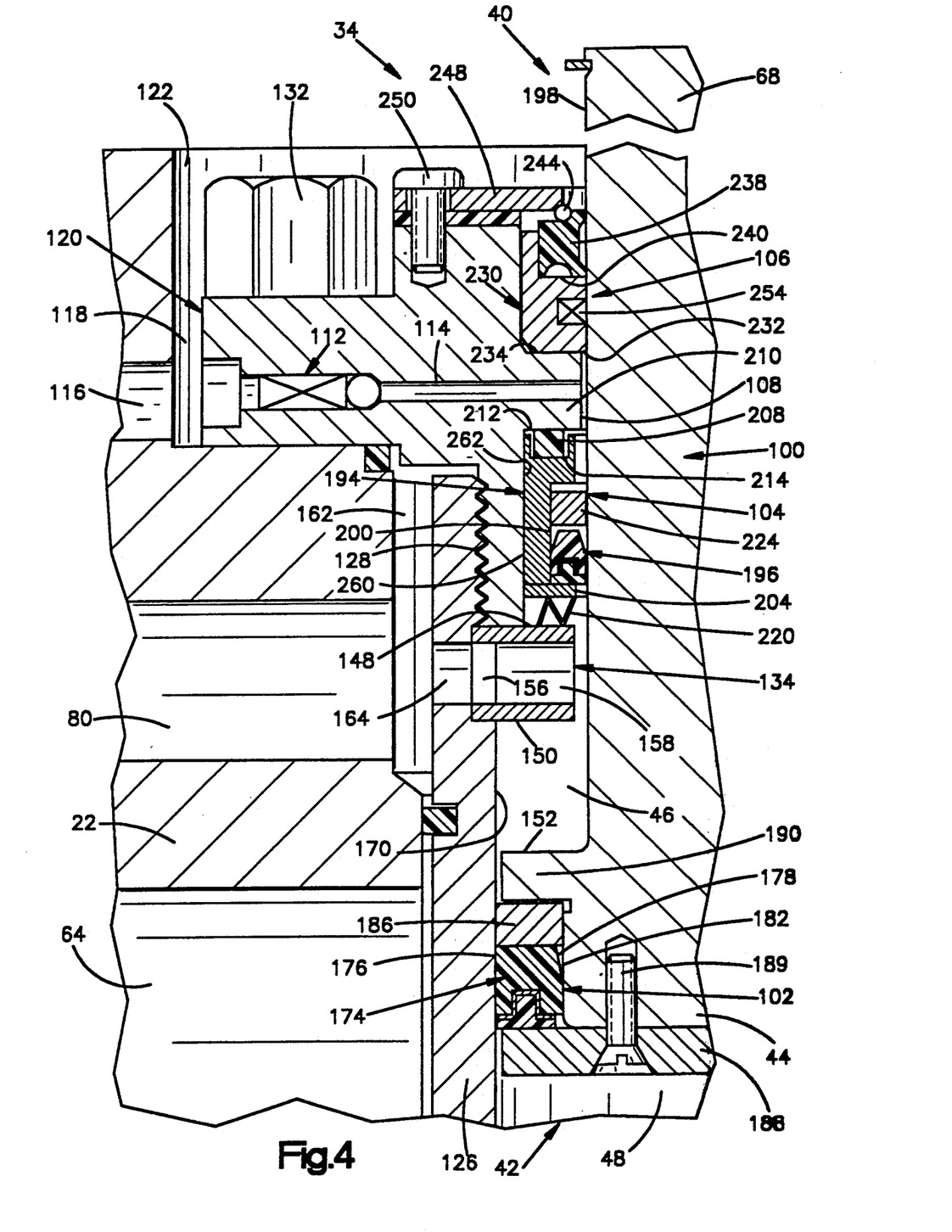
FIG. 4 is a fragmentary sectional view, similar to FIG. 3, illustrating the relationship between components of the cushion assembly with a piston and piston rod moved sidewardly relative to a cylinder assembly.

When the piston rod 68 is subjected to a sideward load to move the piston 44 and piston rod from the position shown in FIG. 3 to a sidewardly offset position shown in FIG. 4, the high pressure piston seal assembly 102, high pressure cylinder seal assembly 104 and low pressure outer seal assembly 106 all move with the piston rod 68 and piston 44. As the piston 44 moves sidewardly, the bearing ring 186 moves from a position spaced from the inner side surface 170 of the cylinder wall 126 to a position in which the bearing ring 186 is disposed in abutting engagement with the cylinder wall (FIG. 4). The rigid annular bearing ring 186 is then effective to transmit force from the piston 44 to the cylinder wall 126 to prevent the application of excessive force to the piston seal ring 174. In addition, the bearing ring 186 maintains the piston 44 spaced from the cylinder wall 126 to avoid metal-to-metal contact between the piston 44 and cylinder wall.

As the piston rod 68 moves sidewardly from the position shown in FIG. 3 to the position shown in FIG. 4, the bearing ring 224 in the high pressure cylinder seal assembly 104 moves the carrier 194 toward the left (as viewed in FIGS. 3 and 4). As the carrier 194 moves sidewardly with the piston rods 68, the cylinder seal ring 208 slides along the flat radially extending lower side surface 212 of the cylinder flange 210. As this is occurring, the washer 204 at the lower end of the carrier 194 slides relative to the wave spring 220. In addition, there may be some movement of the wave spring 220 toward the left (as viewed in FIGS. 3 and 4) relative to the stop ring 134. During this movement of the carrier 194, the rod seal ring 196 maintains a fluid tight seal with both the piston rod 68 and the cylindrical inner side surface 200 of the carrier 194.

Assuming that there is a relatively large amount of sideward movement of the piston rod 68 from the position shown in FIG. 3 to the position shown in FIG. 4, a cylindrical outer side surface 260 on the carrier 194 moves in abutting engagement with a cylindrical inner side surface 262 of the end cap 120 (FIG. 4). Once this occurs, force is transmitted from the piston rod 68 through the bearing ring 224 and carrier 194 to the end cap 120. As the carrier 194 moves sidewardly from the position shown in FIG. 3 to the position shown in FIG. 4, the rod seal ring 196 and cylinder seal ring 208 maintain fluid tight seals with the piston rod 68 and end cap 120 to block fluid flow from the upper variable volume chamber 46 to the leak down chamber 108.

The low pressure outer seal assembly 106 also moves sidewardly with the piston rod 68. Thus, as the piston rod 68 moves from the position shown in FIG. 3 to the position shown in FIG. 4, the annular carrier 230 moves sidewardly with the piston rod. The upper seal or scraper ring 238 is deflected slightly as the piston rod 68 moves to the position shown in FIG. 4. However, the scraper ring 238 maintains solid engagement with the outer side side 198 of the piston rod 68 to block the movement of contaminants along the piston rod 68 into the leak down chamber 108. The O-ring 244 continues to cooperate with the scraper ring 238 to prevent the entry of contaminants between the cover plate 248 and the scraper ring.

Conclusion

In view of the foregoing description, it is apparent that the present invention provides a new and improved seal arrangement 100 for use in a press assembly 20. The seal arrangement 100 includes a high pressure piston seal assembly 102. The piston seal assembly 102 is connected with a piston 44 and is disposed in sealing engagement with a cylinder 42 to block fluid flow between chambers 46 and 48 on opposite sides of the piston A high pressure cylinder seal assembly 104 is connected with the cylinder 42. The high pressure cylinder seal assembly 104 is disposed in sealing engagement with a piston rod 68 to block fluid flow from the cylinder along the piston rod.

A low pressure outer seal assembly 106 is disposed between the cylinder 42 and piston rod 68 to block contaminants from outside the cylinder from entering the cylinder. Any fluid which may leak past the high pressure cylinder seal assembly 104 is received in a leak down chamber 108 formed between the high pressure cylinder seal assembly 104 and the low pressure outer seal assembly 106. A pressure relief assembly may advantageously be provided to exhaust fluid pressure from the leak down chamber 108. The pressure relief assembly prevents exposure of the low pressure seal assembly 106 to excessive fluid pressures during operation of the press assembly 20.

Although the various seal assemblies could be mounted in many different ways, one or more of the seal assemblies may advantageously be disposed in an end cap 120 connected with one end of the cylinder 42. Thus, the high pressure cylinder seal assembly 104 and the low pressure outer seal assembly 106 may be disposed in the end cap 120. The high pressure cylinder seal assembly 104 may be disposed between a side surface 212 of the end cap 120 and a side surface 148 of a flange 134 which extends radially inwardly from the wall 126 of the cylinder 42. If desired, the flange 134 may be used as a stop to limit movement of the piston 44.

Having described one specific preferred embodiment of the invention, the following is claimed:

1. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, and a cushion assembly operable toward a retracted condition to provide a yieldable force opposing movement of at least one of said members in the first direction during operation of said press assembly from the open condition toward the closed condition, said cushion assembly including a cylinder, a piston disposed in said cylinder and cooperating with said cylinder to at least partially define first and second variable volume chambers, a piston rod connected with said piston, said piston rod extending from said piston through said second variable volume chamber to an outer end portion disposed adjacent to one end of said cylinder, first high pressure seal means connected with said piston and disposed in sealing engagement with said cylinder for blocking fluid flow between said first and second variable volume chambers, second high pressure seal means connected with said cylinder and disposed in sealing engagement with said piston rod for blocking fluid flow from said second variable volume chamber along said piston rod, low pressure seal means connected with said cylinder at a location adjacent to said one end of said cylinder and disposed in engagement with said piston rod for blocking contaminants in the environment outside said cylinder from entering said cylinder, said second high pressure seal means and said low pressure seal means cooperating with said cylinder and said piston rod to at least partially define a third chamber for receiving fluid which leaks past said second high pressure seal means, and pressure relief means for exhausting fluid pressure from the third chamber when the fluid pressure in the third chamber reaches a predetermined fluid pressure to thereby prevent exposure of said low pressure seal means to excessive fluid pressures during operation of said press assembly.

2. A press assembly as set forth in claim 1 wherein said cylinder includes a cylinder wall, an end cap connected with said cylinder wall, and an annular stop ring connected with said cylinder wall and end cap, said stop ring having surface means extending inwardly from said cylinder wall and engagable by said piston to stop movement of said piston toward said end cap during operation of said press assembly.

3. A press assembly as set forth in claim 2 further including passage means extending through said stop ring for conducting fluid flow between said second variable volume chamber and a location outside of said cylinder.

4. An apparatus as set forth in claim 3 wherein said passage means includes an annular manifold passage and a plurality of feed passages extending radially of said stop ring for conducting fluid flow between said second variable volume chamber and said manifold passage.

5. A press assembly as set forth in claim 2 wherein said second high pressure seal means is disposed in an inner end portion of said end cap adjacent to said annular stop ring, said low pressure seal means being disposed in an outer end portion of said end cap, said end cap including passage means for conducting fluid flow from said third chamber upon operation of said pressure relief means.

6. A press assembly as set forth in claim 1 wherein said second high pressure seal means and said low pressure seal means are movable sidewardly relative to said cylinder with said piston rod upon sideward movement of said piston rod relative to said cylinder.

7. A press assembly as set forth in claim 1 wherein said cylinder includes a radially extending side surface extending transversely to and circumscribing a cylindrical outer side surface of said piston rod, said second high pressure seal means including a rigid annular seal carrier which circumscribes the cylindrical outer side surface of said piston rod, a first high pressure seal disposed in sealing engagement with said seal carrier and the cylindrical outer side surface of said piston rod to block fluid flow between said piston rod and said seal carrier, and a second high pressure seal disposed in sealing engagement with said seal carrier and the radially extending side surface of said cylinder to block fluid flow between said cylinder and said seal carrier.

8. A press assembly a set forth in claim 7 wherein said second high pressure seal means includes spring means for supporting said seal carrier and for urging said seal carrier toward the radially extending side surface of said cylinder to press said second high pressure seal against the radially extending side surface of said cylinder.

9. A press assembly as set forth in claim 7 wherein said cylinder further includes an annular stop ring having an axially inner side surface which is engagable by said piston and an axially outer side surface which engages said spring means and extends parallel to said radially extending side surface of said cylinder.

10. A press assembly as set forth in claim 7 wherein said second high pressure seal means includes an annular bearing disposed between said seal carrier and the cylindrical outer side surface of said piston rod for transmitting force from said piston rod to said seal carrier to move said seal carrier sideways upon sideways movement of said piston rod.

11. A press assembly as set forth in claim 1 further including means for transmitting fluid pressure to said second variable volume chamber prior to movement of said first and second members together to move said piston in a direction to increase the size of the second variable volume chamber and decrease the size of the first variable volume chamber to initiate operation of said cushion assembly toward a retracted condition.

12. A press assembly as set forth in claim 1 said piston rod is movable between a first position in which a central axis of said piston rod is aligned with a central axis of said cylinder and anyone of a plurality of offset positions in which the central axis of said piston rod is offset relative to the central axis of said cylinder, said cylinder including an annular inner side surface extending transversely to the central axis of said piston rod, said second high pressure seal means including a rigid circular seal carrier which circumscribes said piston rod and an annular seal element mounted on said seal carrier and disposed in sealing engagement with said annular inner side surface of said cylinder, said seal carrier and said seal element being movable with said piston rod to move said seal element radially relative to said annular inner side surface of said cylinder during movement of said piston rod between said first position and said offset positions.

13. An apparatus to cushion movement of a member in a press, said apparatus comprising a cylinder assembly, said cylinder assembly comprising a cylinder wall, an annular flange located adjacent to one axial end portion of said cylinder wall and having a first side surface facing axially inwardly and a second side surface facing axially outwardly, and an end cap connected with said one axial end portion of said cylinder wall and at least partially disposed axially outwardly of said annular flange, said end cap having a first annular inner side surface facing toward said flange and a second annular inner side surface facing away from said flange, a piston disposed in said cylinder assembly and cooperating with said cylinder assembly to at least partially define first and second variable volume chambers, a piston rod connected with said piston, said piston rod extending from said piston through said second variable volume chamber and through said end cap, a first seal assembly connected with said piston and disposed in sealing engagement with said cylinder wall to block fluid flow between said first and second variable volume chambers, a second seal assembly disposed between said axially outwardly facing side surface on said flange and said first annular inner side surface on said end cap, said second seal assembly including a rigid annular carrier member circumscribing said piston rod and movable sidewardly with said piston rod relative to said end cap, an annular rod seal disposed in sealing engagement with said piston rod and said carrier to block fluid flow from the second variable volume chamber along a path extending between said piston rod and said carrier, an annular cylinder seal disposed in sealing engagement with said cylinder assembly and said carrier to block fluid flow from the second variable volume chamber along a path extending between said cylinder assembly and said carrier, and spring means for providing force against said carrier to press said cylinder seal against said cylinder assembly, said spring means, carrier and cylinder seal being disposed between and being effective to apply force against said first annular side surface on said end cap and said second side surface on said annular flange, and a third seal assembly disposed in said end cap at a location axially outwardly of said second seal assembly for blocking contaminants in the environment outside of said cylinder assembly from entering said cylinder, said third seal assembly being disposed in engagement with said piston rod and said second annular inner side surface on said end cap.

14. An apparatus as set forth in claim 13 wherein said piston has an annular side surface disposed adjacent to an inner end of said piston rod and engagable with said first side surface on said annular flange to limit movement of said piston in one direction.

15. An apparatus as set forth in claim 13 wherein said second seal assembly and said third seal assembly cooperate with said piston rod and end cap to at least partially define a third chamber for receiving fluid which leaks past said second seal assembly, said apparatus further including pressure relief means for exhausting fluid pressure from the third chamber when the fluid pressure in the third chamber reaches a predetermined fluid pressure.

16. An apparatus as set forth in claim 13 further including passage means extending through said annular flange for conducting fluid flow between said second variable volume chamber and a location outside of said cylinder.

17. An apparatus as set forth in claim 13 wherein said annular flange is formed separately from said cylinder wall and is clamped against said cylinder wall by said end cap.

18. A press assembly operable from an open condition to a closed condition to deform a workpiece, said press assembly comprising a first movable member for engaging a first side of the workpiece, a second movable member for engaging a second side of the workpiece, said first member being movable in a first direction toward said second member during operation of said press assembly from an open condition toward a closed condition, said first and second members being movable together in the first direction with at least a portion of the workpiece disposed between said first and second members during operation of said press assembly from the open condition toward the closed condition, a cushion assembly operable toward a retracted condition to provide a yieldable force opposing movement of said second member in the first direction during operation of said press assembly from the open condition toward the closed condition, said cushion assembly including a cylinder, a piston disposed in said cylinder and cooperating with said cylinder to at least partially define first and second variable volume chambers, said first variable volume chamber holding a body of fluid, a piston rod connected with said piston, said piston rod extending from said piston through said second variable volume chamber to an outer end portion disposed adjacent to one end of said cylinder and to said second member, first seal means connected with said piston and disposed in sealing engagement with said cylinder for blocking fluid flow between said first and second variable volume chambers, second seal means connected with said cylinder and disposed in sealing engagement with said piston rod for blocking fluid flow from said second variable volume chamber along said piston rod, and third seal means connected with said cylinder at a location adjacent to said one end of said cylinder and disposed in engagement with said piston rod for blocking contaminants in the environment outside said cylinder from entering said cylinder, and control means for conducting fluid pressure to said second variable volume chamber to move said piston against the influence of the body of fluid in said first variable volume chamber and to effect operation of said cushion assembly toward the retracted condition and movement of said second member in the first direction prior to movement of said first and second members together in the first direction during operation of said press assembly from the open condition toward the closed condition.

19. A press assembly as set forth in claim 18 wherein said second seal means and said third seal means cooperate with said cylinder and said piston rod to at least partially define a third chamber for receiving fluid which leaks past said second seal means, said press assembly further including pressure relief means for exhausting fluid pressure from the third chamber when the fluid pressure in the third chamber reaches a predetermined fluid pressure to thereby prevent exposure of said low pressure seal means to excessive fluid pressures during operation of said press assembly.

20. A press assembly as set forth in claim 18 wherein said cylinder includes a cylinder wall and an annular stop ring connected with said cylinder wall, said stop ring having surface means extending inwardly from said cylinder wall and engagable by said piston to stop movement of said piston toward said one end of said cylinder during operation of said press assembly.

21. A press assembly as set forth in claim 20 further including passage means extending through said stop ring for conducting fluid flow between said second variable volume chamber and said control means.

22. An apparatus as set forth in claim 21 wherein said passage means includes an annular manifold passage and a plurality of feed passages extending radially of said stop ring for conducting fluid flow between said second variable volume chamber and said manifold passage.

23. A press assembly as set forth in claim 20 wherein said cylinder includes an end cap connected with said cylinder wall and at least partially defining said one end of said cylinder, said second seal means being disposed in an inner end portion of said end cap adjacent to said annular stop ring, said third seal means being disposed in an outer end portion of said end cap.

24. A press assembly as set forth in claim 18 wherein said second seal means and said third seal means are movable sidewardly relative to said cylinder with said piston rod upon sideward movement of said piston rod relative to said cylinder.

25. A press assembly as set forth in claim 18 wherein said cylinder includes a radially extending side surface extending transversely to and circumscribing a cylindrical outer side surface of said piston rod, said second seal means including a rigid annular seal carrier which circumscribes the cylindrical outer side surface of said piston rod, a first high pressure seal disposed in sealing engagement with said seal carrier and the cylindrical outer side surface of said piston rod to block fluid flow between said piston rod to block fluid flow between said piston rod and said seal carrier, and a second high pressure seal disposed in sealing engagement with said seal carrier and the radially extending side surface of said cylinder to block fluid flow between said cylinder and said seal carrier.

26. A press assembly a set forth in claim 25 wherein said second seal means includes spring means for supporting said seal carrier and for urging said seal carrier toward the radially extending side surface of said cylinder to press said second high pressure seal against the radially extending side surface of said cylinder.

27. A press assembly as set forth in claim 25 wherein said cylinder further includes an annular stop ring having an axially inner side surface which is engagable by said piston and an axially outer side surface which engages said spring means and extends parallel to said radially extending side surface of said cylinder.

28. A press assembly as set forth in claim 25 wherein said second seal means includes an annular bearing disposed between said seal carrier and the cylindrical outer side surface of said piston rod for transmitting force from said piston rod to said seal carrier to move said seal carrier sideways upon sideways movement of said piston rod.

29. A press assembly as set forth in claim 18 said piston rod is movable between a first position in which a central axis of said piston rod is aligned with a central axis of said cylinder and anyone of a plurality of offset positions in which the central axis of said piston rod is offset relative to the central axis of said cylinder, said cylinder including an annular inner side surface extending transversely to the central axis of said piston rod, said second seal means including a rigid circular seal carrier which circumscribes said piston rod and an annular seal element mounted on said seal carrier and disposed in sealing engagement with said annular inner side surface of said cylinder, said seal carrier and said seal element being movable with said piston rod to move said seal element radially relative to said annular inner side surface of said cylinder during movement of said piston rod between said first position and said offset positions.

30. A press assembly as set forth in claim 18 wherein said second seal means includes a rigid annular carrier member circumscribing said piston rod and movable sidewardly with said piston rod relative to said cylinder, an annular rod seal disposed in sealing engagement with said piston rod and said carrier to block fluid flow from the second variable volume chamber along a path extending between said piston rod and said carrier, an annular cylinder seal disposed in sealing engagement with said cylinder and said carrier to block fluid flow from the second variable volume chamber along a path extending between said cylinder and said carrier.

31. A press assembly as set forth in claim 18 wherein said control means includes means for transmitting force from said first member to generate fluid pressure conducted to said second variable volume chamber of said cushion assembly during operation of said press assembly from the open condition toward the closed condition and for transmitting fluid pressure from said second variable volume chamber of said cushion assembly to said means for transmitting force to generate force transmitted to said first member during operation of said press assembly from the closed condition toward the open condition.

32. A press assembly as set forth in claim 18 wherein said first and second members are movable together in a second direction opposite to the first direction during operation of said press assembly from the closed condition to the open condition, said control means including means for maintaining fluid pressure in said second variable volume chamber to oppose operation of said cushion assembly during movement of said first and second members together in the second direction to decrease the speed of movement of said second member in the second direction to a speed which is less than the speed of movement of said first member in the second direction during operation of said press assembly from the closed condition to the open condition.

33. A press assembly as set forth in claim 18 wherein said control means includes means for generating a fluid pressure under the influence of force transmitted from said first member and means for conducting the generated fluid pressure to said second variable volume chamber in said cushion assembly during operation of said press assembly from the open condition to the closed condition.

34. A press assembly as set forth in claim 18 wherein said control means includes means for retarding operation of said cushion assembly from the retracted condition during operation of said press assembly from the closed condition to the open condition.

35. A press assembly as set forth in claim 18 wherein said control means includes a second cylinder, a second piston disposed in said second cylinder, means for transmitting force from said first member to said second piston to pressurize fluid in said third variable volume chamber, and means for conducting fluid pressure from said third variable volume chamber to said second variable volume chamber in said cushion assembly to effect operation of said cushion assembly toward the retracted condition under the influence of fluid pressure conducted from said third variable volume chamber.

* * * * *

UNITED STATES PATENT AND TRADEMARK OFFICE
CERTIFICATE OF CORRECTION

PATENT NO. : 5,007,276
DATED : April 16, 1991
INVENTOR(S) : Paul M. Kadis and Susan E. Pfaff It is certified that error appears in the above-identified patent and that said Letters Patent is hereby corrected as shown below:

Column 16, Line 20, Claim 12, after "1" insert --wherein--.

Column 19, Line 25, Claim 29, after "18" insert --wherein--.

Signed and Sealed this

Fourteenth Day of September, 1993

*Attest:*

BRUCE LEHMAN

*Attesting Officer*        *Commissioner of Patents and Trademarks*